Aug. 28, 1962   D. G. WEBSTER   3,051,502
TRUCK TANKER CONSTRUCTION
Filed May 7, 1957   3 Sheets-Sheet 2

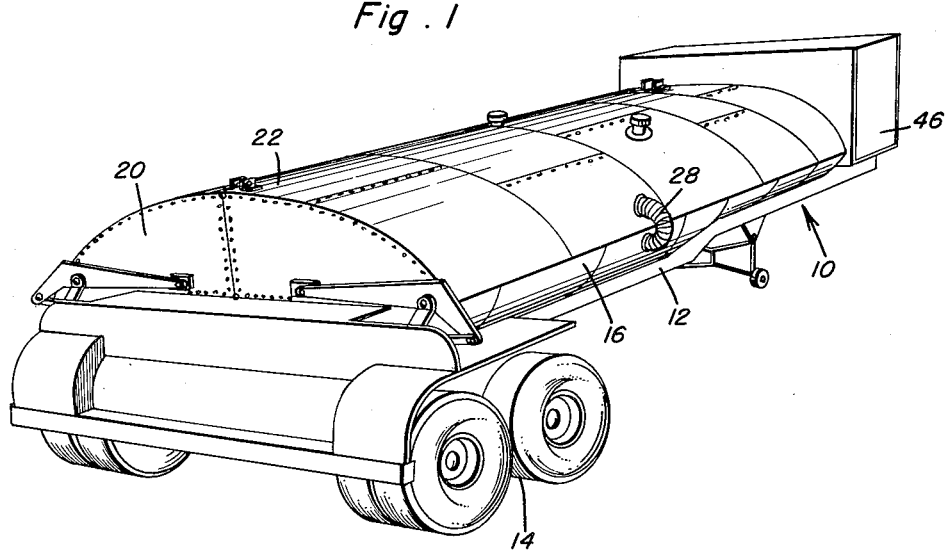
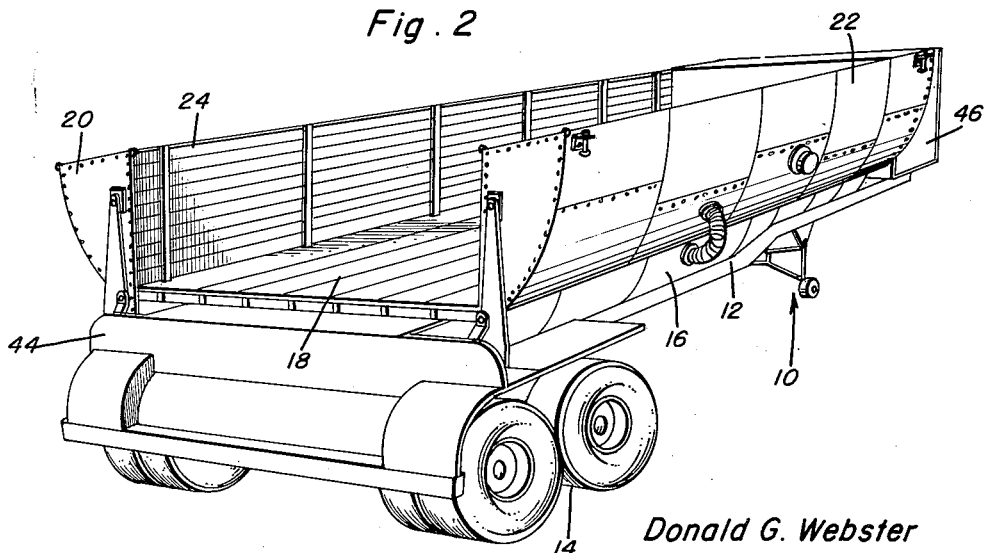

Donald G. Webster
INVENTOR.

BY *Clarence A. O'Brien*
*and Harvey B. Jacobson*
Attorneys

Aug. 28, 1962 D. G. WEBSTER 3,051,502
TRUCK TANKER CONSTRUCTION
Filed May 7, 1957
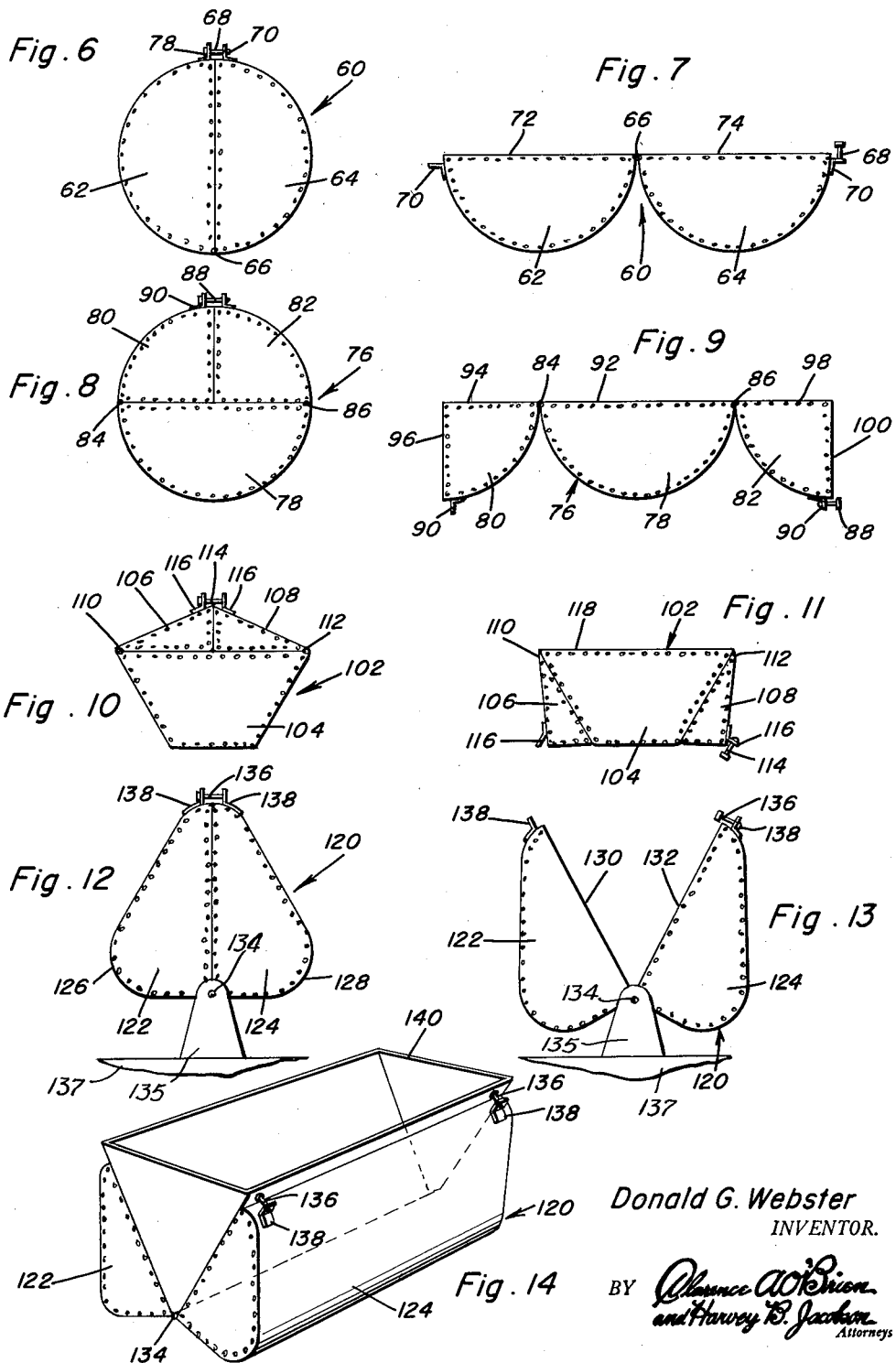
Donald G. Webster
INVENTOR.

# United States Patent Office 3,051,502  
Patented Aug. 28, 1962

3,051,502  
TRUCK TANKER CONSTRUCTION  
Donald G. Webster, 4018 N. Monroe St., Spokane, Wash.  
Filed May 7, 1957, Ser. No. 657,683  
9 Claims. (Cl. 280—5)

This invention relates in general to new and useful improvements in transportation devices and more specifically to an improved transportation device which may be readily converted from a tanker to a transportation device for transporting cargoes other than liquid cargoes.

In many parts of the country gasoline and other liquid cargoes are transported from point to point by special tanker ships and tank trucks. However, the gasoline and other liquid cargoes are only carried in one direction with the result that the ships and trucks must return to their starting points empty due to the fact that they are incapable of carrying other types of cargoes. Since the expense of operating a ship or truck varies little whether it is loaded or empty, it will be seen that it is highly desirable that a tanker ship or a tank truck be converted at the end of its liquid cargo carrying trip for carrying cargoes other than liquid cargoes on its return trip.

It is therefore the primary object of this invention to devise a transportation device, either in the form of a ship, railroad car or truck which is so constructed whereby when carrying a liquid cargo the tanks therof are arranged for the most convenient carrying of a liquid cargo and the tanks are so pivotally connected together whereby they may be rearranged when empty for transporting cargoes other than liquid cargoes.

Another object of this invention is to provide an improved transporation device which includes a plurality of individual tanks extending longitudinally of the transportation device, the tanks having abutting flat surfaces which may be swung apart and presented for the purpose of supporting machinery and other cargoes other than liquid cargoes.

Still another object of this invention is to provide an improved transportation device in the form of a ship, railroad car or truck which includes a base tank and a pair of upper tanks normally overlying and resting upon the base tank for the transportation of liquid cargoes, the upper tanks being pivotally connected to the base tank and there being provided means for swinging the upper tanks relative to the base tank whereby the upper surface of the base tank may be utilized for the purpose of loading machinery, boxes and other cargoes which are non-liquid.

A further object of this invention is to provide a tank arrangement for transportation vehicles, which tank arrangement is readily adaptable for all classes of transportation vehicles and devices and which may be used to readily convert the transportation vehicle from a vehicle intended for the transportation of liquid cargoes to one for the transportation of non-liquid cargoes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear perspective view of a tank truck showing the tank truck with the tanks therof in position for transporting liquid cargo;

FIGURE 2 is a rear perspective view of the tank truck of FIGURE 1 with the upper tanks thereof swung upwardly to expose the upper surface of a base tank with the tank truck in condition for transporting non-liquid cargoes;

FIGURE 6 is a schematic rear view of a modified form of tank truck when in its liquid cargo carrying position;

FIGURE 7 is a rear view of the tank truck of FIGURE 6 with the tanks thereof swung into a position for carrying a non-liquid cargo;

FIGURE 8 is a rear view of another form of tank truck;

FIGURE 9 is a rear view of the tank truck of FIGURE 8 with the tanks thereof swung to a non-liquid cargo carrying position;

FIGURE 10 is a rear view of still another form of tank truck;

FIGURE 11 is a rear view of the tank truck of FIGURE 10 with the upper tanks thereof swung to a position beneath the base tank for the purpose of transporting a deck cargo;

FIGURE 12 is a rear view of still another form of tank truck;

FIGURE 13 is a rear view of the tank truck of FIGURE 12 with the tanks thereof swung apart; and FIGURE 14 is a perspective view of the tank truck of FIGURE 12 with a special hopper type body positioned between the swung apart tanks for transporting bulk loose cargo such as coal, etc.

Figure 3:
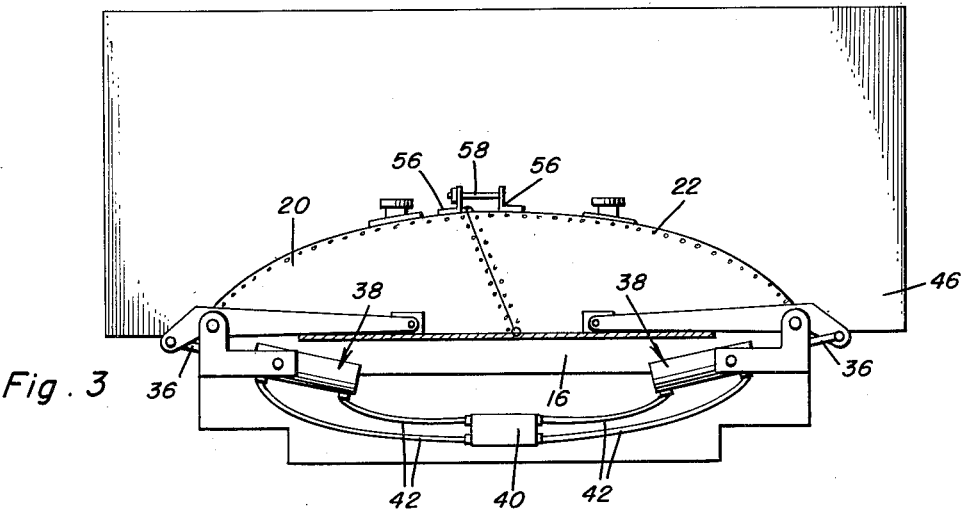
FIGURE 3 is a rear view of the tank assembly of the tank truck of FIGURE 1.

Referring now to the drawings in detail, there is illustrated in FIGURES 1–5, inclusive, a preferred form of tank truck which is referred to in general by the reference numeral 10. The tank truck 10 illustrated is in the form of a trailer which may be towed by any tractor (not shown) and includes a suitable frame 12 and a rear wheel assembly 14. Mounted on the frame 12 is a base tank 16 having a flat upper surface 18 which may be decked as is desired for transporting machinery and the like. Normally overlying the base tank 16 and resting thereupon are upper tanks 20 and 22. The tanks 20 and 22 combine with the base tank 16 to form a tank truck of the usual configuration. However, the upper tanks 20 and 22 are provided with normally lower flat surfaces 24 and 26, respectively, which are intended to become sides of the truck when it is converted for hauling machinery and the like. In order that the tanks 16, 20 and 22 may be communicated with each other, there is provided flexible conduits 28 which extend between the upper tanks 20 and 22 and the base tank 16.

Figure 4:
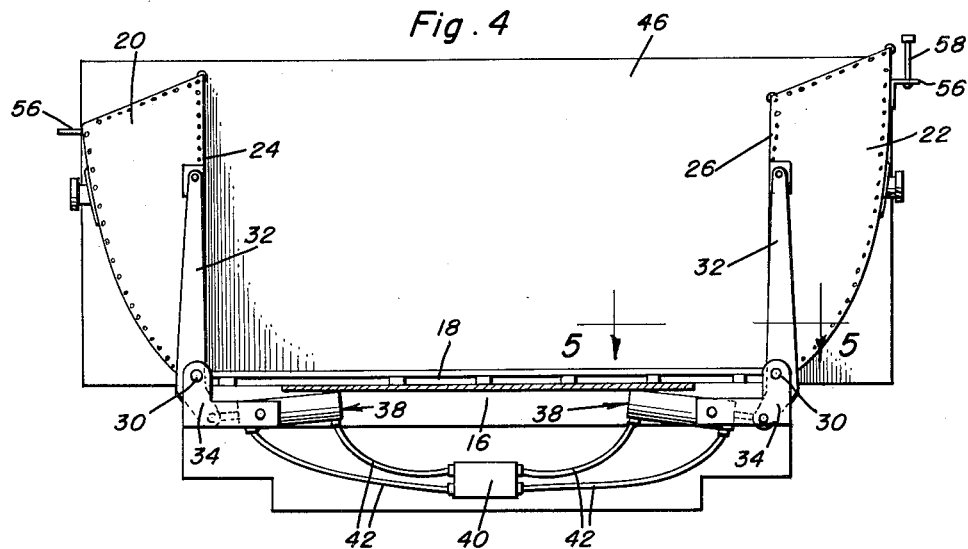
FIGURE 4 is a rear view of the tank truck as it appears in FIGURE 2 and shows the arrangement of the hydraulic cylinders when the top tanks are swung upwardly to form sides of the truck.

Referring now to FIGURES 3 and 4 in particular, it will be seen that the upper tanks 20 and 22 are connected to the base tank 16 at the outer lower edges thereof by means of longitudinal pivots 30. This permits the upper tanks 20 and 22 to normally overlie the base tank 16, as is shown in FIGURE 3, for the purpose of transporting a liquid cargo, and at the same time permits the upper tanks 20 and 22 to be pivoted to upstanding positions whereby their bottom walls 24 and 26 combined with the top wall 18 of the base tank 16 define a conventional type of truck body.

In order that the upper tanks 20 and 22 may be selectively swung to upstanding positions, there is secured to opposite ends of the upper tanks 20 and 22 crank arms 32 which are pivotally mounted on the longitudinal pivots 30. The crank arms 32 are rigidly secured to the upper tanks 20 and 22 and include depending portions 34 to which there are connected piston rods 36 of hydraulic motors 38. The hydraulic motors 38 are connected to suitable valves 40 by means of hydraulic lines 42 and are of the double acting type. The hydraulic motors 38 and the valves 40 are disposed at opposite ends of the truck 10 and are a part of the conventional type of hydraulic system. It is to be understood that the hydraulic motors 38, the valves 40 and the remainder of the hydraulic system will be housed in suitable housings, such as the housing 44 at the rear of the truck 10 and the housing 46 at the forward end thereof.

Figure 5:
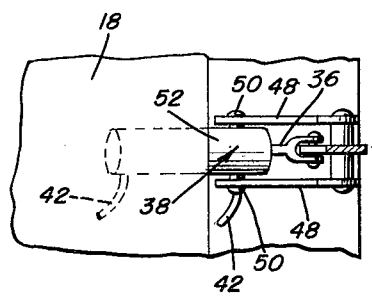
FIGURE 5 is an enlarged fragmentary horizontal sectional view taken substantially upon the plane indicated by the section line 5—5 of FIGURE 4 and shows further the details of one of the hydraulic cylinders.

Referring now to FIGURE 5 in particular, it will be seen that each of the hydraulic motors 38 is mounted with respect to the frame 12 of the truck 10 by means of a pair of mounting plates 48 rigidly carried by the frame 12. The mounting plates 48 carry trunnions 50 which are used to mount the cylinder 52 of the hydraulic motor 38 for swinging movement. The swinging movement of the hydraulic motors 38 is clearly shown in FIGURES 3 and 4 during the operation thereof.

In order that the upper tanks 20 and 22 may be firmly seated upon the base tank 16 and prevented from rattling or jumping, there is carried by each of the upper tanks 20 and 22 at opposite ends thereof a pair of straps 56. The straps are interconnected by bolts 58 when the tanks 20 and 22 are in the positions illustrated in FIGURES 1 and 3.

From the foregoing description of the truck 10, it will be readily apparent that when the truck 10 is in the position illustrated in FIGURES 1 and 3, it is readily adapted for the transportation of liquid cargoes as in the case of any conventional type of tank truck. On the other hand, when it is desired to transport machinery or other types of non-liquid cargoes, the tank truck 10 may be readily converted so as to resemble the ordinary type of truck, as is best shown in FIGURES 2 and 4. Since the tanks 20 and 22 may be readily swung upwardly to their positions in FIGURES 2 and 4 from their positions in FIGURES 1 and 3, respectively, after the bolts 58 have been released, it will be readily apparent that there is no loss of time in the converting of the truck 10 for the carrying of cargoes other than liquid cargoes and therefore the truck 10 need not return to its starting point empty, but may be utilized in the transporting of other cargoes. It will be readily apparent that the initial investment required for the special construction of the truck 10 will be soon recovered by the additional cargo which the truck 10 may carry without extra expense to its owner.

Referring now to FIGURE 6, it will be seen that there is illustrated a modified form of tank type body which is referred to in general by the reference numeral 60. The tank type body 60 includes a pair of semi-cylindrical tanks 62 and 64 which are identical except for being left and right handed. The tanks 62 and 64 are connected together at their lower ends by a longitudinal pivot 66. The tanks 62 and 64 are normally connected together at their upper ends by means of a bolt 68 extending between a pair of straps 70. The tanks 62 and 64, as shown in FIGURE 6, resemble an ordinary type of tank truck or railroad car and are arranged for the transportation of a liquid cargo.

When it is desired to transport a non-liquid cargo of the deck type, the tank type body 60 may be converted for that purpose by swinging the tanks 62 and 64 to the positions illustrated in FIGURE 7. It is to be understood that in order to so pivot and swing the tanks 62 and 64 to the position of FIGURE 7, it will be necessary that there be provided special guides at opposite ends of the tanks 62 and 64 as well as hydraulic cylinders for effecting the swinging of the tanks 62 and 64. In fact the tanks 62 and 64 will move from their positions of FIGURE 6 to their positions of FIGURE 7 by gravity. However, the hydraulic cylinders should be used to control their swinging and are needed for the return of the tanks 62 and 64 to their positions of FIGURE 6.

It is to be noted that when the tanks 62 and 64 are disposed in transverse horizontal alignment, they present upper surfaces 72 and 74 which are in alignment and which form a suitable deck for the transportation of a deck cargo. At the same time, when the tanks 62 and 64 are swung to their liquid cargo carrying positions of FIGURE 6, the surfaces 72 and 74, which are flat, merely abut each other and in no way act as a detriment to the carrying of liquid cargo.

Referring now to FIGURE 8 in particular, there is illustrated another type of tank type body which is referred to in general by the reference numeral 76. The tank type body 76 includes a base tank 78 which is horizontally disposed and is of a semi-cylindrical configuration. Overlying the base tank 74 and normally resting thereupon are upper tanks 80 and 82 which together are of a semi-cylindrical outline whereby the tank type body 76 is of a cylindrical outline when arranged for the carrying of liquid cargoes.

It is to be noted that the upper tanks 80 and 82 are connected to the base tank 78 at their outer lower edges by means of longitudinal pivots 84 and 86, respectively, whereby the upper tanks 80 and 82 may be swung outwardly with respect to the base tank 78. Also, the upper tanks 80 and 82 are normally retained in their liquid cargo carrying positions by means of a bolt 88 extending between straps 90 carried by the upper parts of the upper tanks 80 and 82.

Referring now to FIGURE 9 in particular, it will be seen that the base tank 78 is provided with an upper flat surface 92. Also, the upper tank 80 is provided with a normally vertical flat surface 96 and a normally horizontal flat surface 94. The upper tank 82 is provided with a normally horizontal flat surface 98 and a normally vertical flat surface 100. When the tank type body 76 is in a position for carrying liquid cargoes, as is illustrated in FIGURE 8, the flat surfaces 94 and 98 abut and rest upon the flat surface 92 while the flat surfaces 96 and 100 engage each other. On the other hand, when the tanks 80 and 82 are swung outwardly and downwardly, the flat surfaces 94 and 98 are disposed co-planar with the flat surface 92 and form extensions thereof. The surfaces 92, 94 and 98 then form a platform for the transportation of deck type cargoes. It is to be understood that the tanks 80 and 82 will have connected to them suitable hydraulic motors for the purpose of swinging them between the positions of FIGURE 8 and the positions of FIGURE 9.

Referring now to FIGURE 10, it will be seen that there is illustrated still another tank type body which is referred to in general by the reference numeral 102. The tank type body 102 includes a base tank 104 and upper tanks 106 and 108. The tanks 106 and 108 rest upon the base tank 104 when the tank type body is in a liquid cargo carrying position and have their outer edges connected to the base tank 104 by means of longitudinal pivots 110 and 112, respectively. The tanks 106 and 108 are normally connected together by bolts 114 which extend between straps 116 carried by upper parts of the tanks 106 and 108.

As is clearly shown in FIGURES 10 and 11, the base tank 104 is trapezoidal in outline and is widest at the top. The upper tanks 106 and 108 are triangular in outline and are complementary to the sides of the base tank 104.

When the tank type body 102 is in its liquid cargo carrying position of FIGURE 10, it presents a normal appearing tank type body. On the other hand, the upper tanks 106 and 108 may be swung about their longitudinal pivots 110 and 112, respectively, to positions generally underlying the base tank 104 and at one side thereof. It is to be noted that the tanks 106 and 108 when swung to the positions of FIGURE 11 do not increase the width of the tank type body 102 which is desirable both for use in railroad cars and trucks because of the limitation as to the widths of railroad cars and trucks. When the tanks 106 and 108 are swung to the positions of FIGURE 11, an upper flat surface 118 of the base tank 104 becomes exposed and may be used for the suitable transportation of deck cargoes.

Referring now to FIGURE 12 in particular, it will be seen that there is illustrated a further form of tank type body which is referred to in general by the reference numeral 120. The tank type body 120 includes a pair of normally vertically disposed tanks 122 and 124. The tanks 122 and 124 are identical except for being right and left handed and are generally triangular in cross section, the lower outer parts of the tanks 122 and 124 being rounded as at 126 and 128, respectively.

The tanks 122 and 124 have normally vertically disposed flat surfaces 130 and 132, respectively, which are disposed in abutting relation when in the position illustrated in FIGURE 12. The lower inner parts of the tanks 122 and 124 are pivotally connected together by a longitudinal pivot 134 extending between a pair of pivot mounts 135 which are spaced apart and are supported from a frame 137 to effect the swinging apart of the tanks 122 and 124 to the positions illustrated in FIGURE 13. The tanks 122 and 124 are normally retained in the positions illustrated in FIGURE 12 by bolts 136 which extend between straps 138 carried by upper parts of the tanks 122 and 124.

When it is desired to transport cargoes other than liquid cargoes, the tanks 122 and 124 may be swung apart so that the flat surfaces 130 and 132 may be disposed in upwardly diverging relation, as is best shown in FIGURE 13. When the tanks 122 and 124 are so positioned, then the flat surfaces 130 and 132 may support a special hopper type removable body 140, as is best shown in FIGURE 14. The body 140 is retained in place between the tanks 122 and 124 by means of the bolts 136 and the straps 138, as is best shown in FIGURE 14. The hopper type body 140 is suitable for carrying bulk granular cargo such as coal, grains, etc. It is to be understood that the tank type body 120 will be provided with suitable hydraulic motors at opposite ends thereof for the purpose of positioning the tanks 122 and 124 as is required and also that the tank type body 60 may have its tanks 62 and 64 supported from a frame similar to frame 137 by means of pivot mounts (not shown) similar to pivot mounts 135. Additionally, the tanks 78 and 104 of the tank bodies 76 and 102 may each be rigidly supported from a suitable frame whereby each of the tanks 78 and 104 thereby comprise support means supported from such a frame for mounting the tanks 80, 82 and 106, 108 respectively for swinging movement relative to the frame.

While there has only been illustrated a tank truck and the various forms of the invention have been generally described as being adaptable for tank truck construction, it is to be understood that the invention is not intended to be so limited. The invention may be utilized in conjunction with any type of transportation device, such as ships, barges, railroad cars, trailers, ordinary trucks and the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a convertible transportation vehicle of the tanker type including a frame having a plurality of supporting wheels, a sealed tank body construction carried by said frame, said tank body construction including a plurality of individual, adjoining, and sealed tanks, said tanks being normally arranged in a compact manner for transporting a liquid cargo, support means supported from said frame, means pivotally mounting each of two of said adjoining tanks of said tank construction on said support means along one side of each of said two adjoining tanks for movement about a fixed axis of rotation generally paralleling an axis extending longitudinally of said frame for movement toward and away from each other providing a space therebetween for carrying bulk cargo when said pivotally mounted tanks are pivoted away from each other.

2. The combination of claim 1 wherein said tanks are two in number and are identical in cross-section except for being right and left-handed, said tanks normally having vertically disposed flat surfaces.

3. The combination of claim 1 wherein said tanks are two in number and are identical in cross-section except for being right and left-handed, said tanks normally having vertically disposed flat surfaces, said flat surfaces diverging upwardly when said tanks are pivoted away from each other.

4. The combination of claim 3 including a removable hopper of V-shaped cross-section disposable between said diverging flat surfaces.

5. A convertible transportation vehicle of the tanker type including an elongated frame having a plurality of supporting wheels, a sealed tank body construction carried by said frame, said tank body construction including a plurality of individual, adjoining and sealed tanks, said tanks being normally arranged in a compact manner for transporting a liquid cargo, said tanks each having at least one flat surface, said tanks being normally arranged with said flat surfaces in opposed relation for transporting a liquid cargo, support means supported from said frame pivotally mounting each of two of said adjoining tanks in connected relation for movement about a fixed axis of rotation generally paralleling an axis extending longitudinally of said frame toward and away from each other whereby said tanks may be swung apart and a flat surface of one of said tanks disposed for the transportation of bulk cargo.

6. The combination of claim 5 wherein said tanks equal three in number and said two of said tanks being disposed relative to the third in a manner whereby when they are swung away from each other the upper surface of the third tank will be exposed to form a cargo supporting deck between said two of said tanks.

7. The combination of claim 5 wherein said support means includes means for mounting said two of said tanks for movement away from each other to a position with the flat surfaces thereof disposed in side-by-side and coplanar relation.

8. The combination of claim 5 wherein said tanks include a base tank having a flat upper surface, the other of said tanks normally overlying said base tank for transporting liquid cargoes, said support means mounting said other tanks to said base tank for swinging movement out of overlying relation to said base tank and exposing said flat upper surface for the transporting of cargoes other than liquid cargoes.

9. A convertible transportation vehicle of the tanker type including a frame having a plurality of supporting wheels, a sealed tank body construction carried by said frame, said tank body construction including a plurality of individual, adjoining, and sealed tanks, support means supported from said frame mounting each of two of said adjoining tanks for swinging movement about a fixed horizontal axis generally paralleling an axis extending longitudinally of said frame toward and away from each other defining a space for carrying additional cargo therebetween when said pivotally mounted tanks are swung apart.

References Cited in the file of this patent

UNITED STATES PATENTS

| | | |
|---|---|---|
| 822,262 | Engh | June 5, 1906 |
| 2,365,446 | Barton | Dec. 19, 1944 |
| 2,726,004 | McLeod | Dec. 6, 1955 |